United States Patent [19]

Nordström

[11] 4,347,794

[45] Sep. 7, 1982

[54] PALLET FOR USE AS A LOAD-CARRYING SUPPORT

[76] Inventor: Claes Nordström, Sigvard Grubbesgatan 12, S-230 40 Bara, Sweden

[21] Appl. No.: 169,080

[22] Filed: Jul. 15, 1980

[30] Foreign Application Priority Data

Jul. 19, 1979 [SE] Sweden ............................ 7906201

[51] Int. Cl.$^3$ .................... B65D 19/28; B65D 19/44
[52] U.S. Cl. .................... 108/51.1; 108/55.1; 193/35 SS; 193/35 MD; 414/403
[58] Field of Search ............... 108/51.1, 57.1, 901, 108/56.1, 55.1, 55.3; 206/386, 596, 598–600; 193/35 SS, 35 MD, 35 A; 414/529, 530, 403

[56] References Cited

U.S. PATENT DOCUMENTS

| | | | |
|---|---|---|---|
| 1,322,808 | 11/1919 | Mikaelson | 193/35 MD X |
| 1,660,512 | 2/1928 | Jaenicke | 193/35 A |
| 3,093,092 | 6/1963 | Martin et al. | 108/57.1 X |
| 3,118,400 | 1/1964 | Kemp, Jr. et al. | 108/57.1 |
| 3,279,631 | 10/1966 | McCartney | 193/35 MD X |
| 3,312,320 | 4/1967 | Froio | 193/35 A |
| 3,592,145 | 7/1971 | Petry | 108/51.1 |
| 3,690,485 | 9/1972 | Fischer et al. | 108/56.1 |
| 3,789,960 | 2/1974 | Warren | 193/35 A X |
| 3,964,588 | 6/1976 | Kornylak | 193/35 MD X |
| 4,000,796 | 1/1977 | Bolton et al. | 193/35 A |
| 4,036,345 | 7/1977 | Webb | 193/35 MD X |
| 4,095,769 | 6/1978 | Fengels | 108/54.1 X |
| 4,205,740 | 6/1980 | Hammond | 193/35 A |

FOREIGN PATENT DOCUMENTS

| | | | |
|---|---|---|---|
| 2152430 | 4/1973 | Fed. Rep. of Germany | 193/35 MD |
| 564219 | 7/1977 | U.S.S.R. | 108/53.5 |

Primary Examiner—William E. Lyddane
Attorney, Agent, or Firm—Beveridge, DeGrandi & Kline

[57] ABSTRACT

The present invention relates to a pallet which is particularly, but not exclusively intended for use in cargo terminals or other stations where goods are transferred from one means of transportation to another to facilitate loading, unloading and reloading of goods, but which is also useful for the ordinary purposes of the pallet. Characteristic of the invention is that the pallet comprises a body in the form of a rectangular, relatively lightweight framework of light metal or aluminum beams with a load-carrying surface formed by a plurality of rollers, preferably in the form of ball roller means, connected to the framework, and with at least one brake roller which is supported in such a position that goods having planar undersides, which, when carried on the pallet, are moved on the rollers, will be braked by means of the brake roller which is preferably carried by a swiveling frame to permit braking in whatever direction the goods are shifted.

10 Claims, 6 Drawing Figures

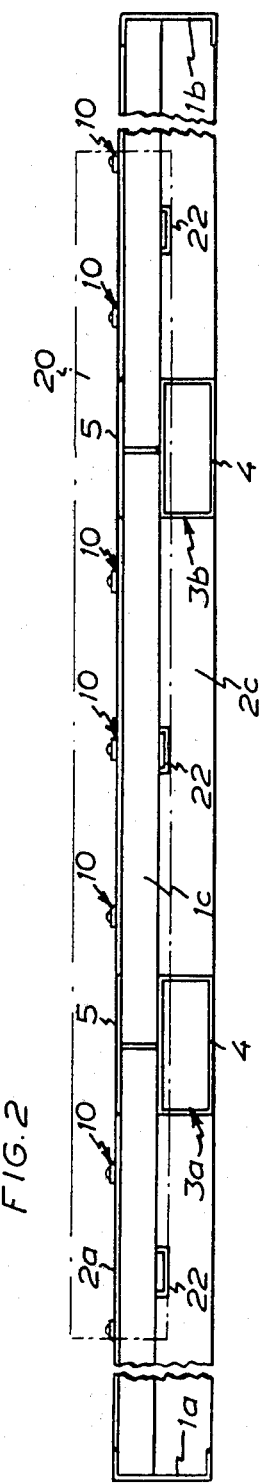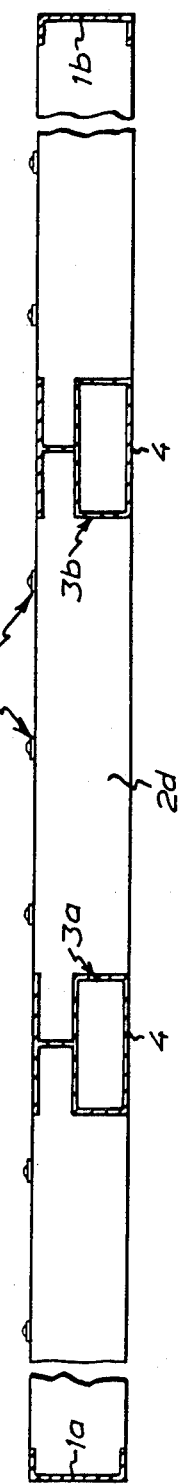

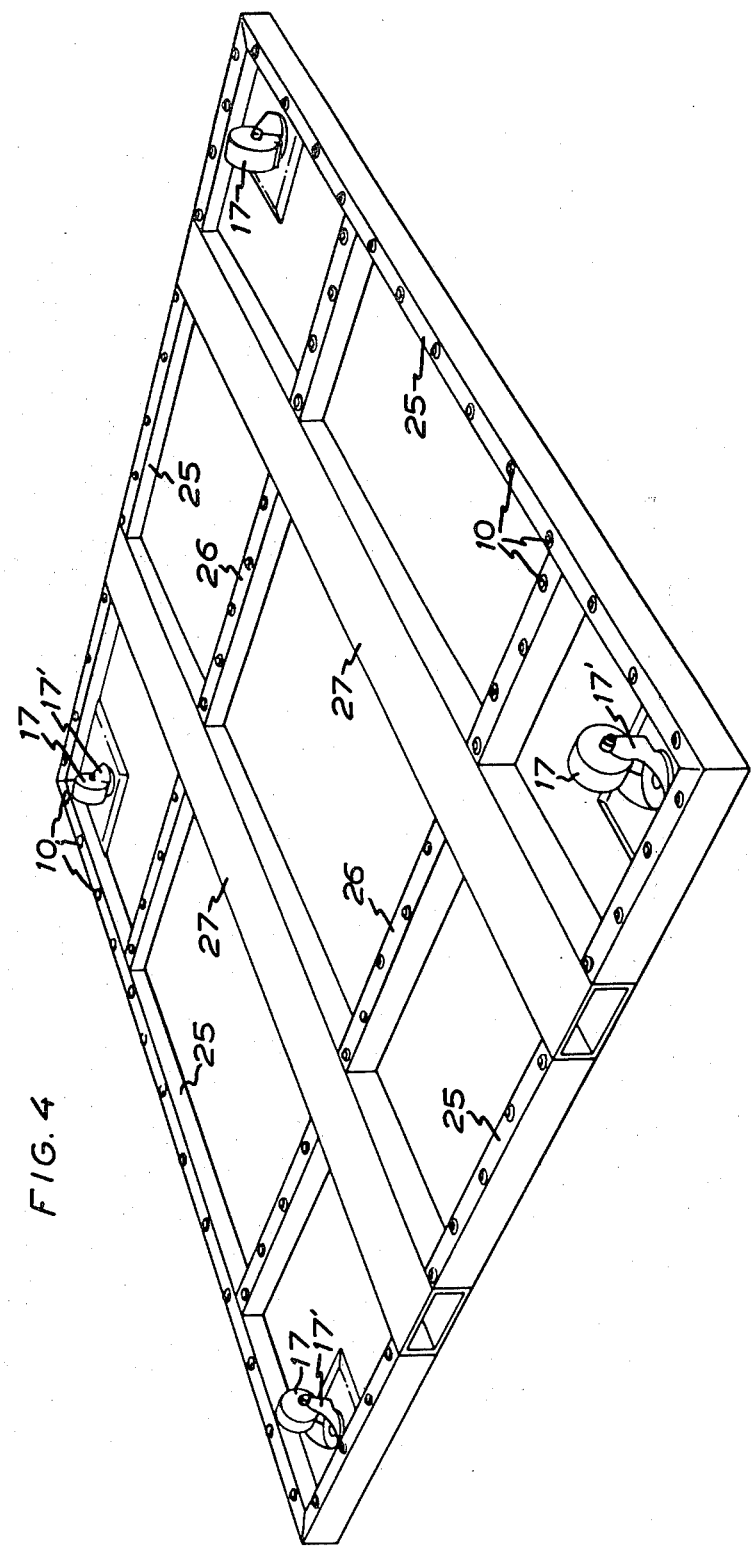

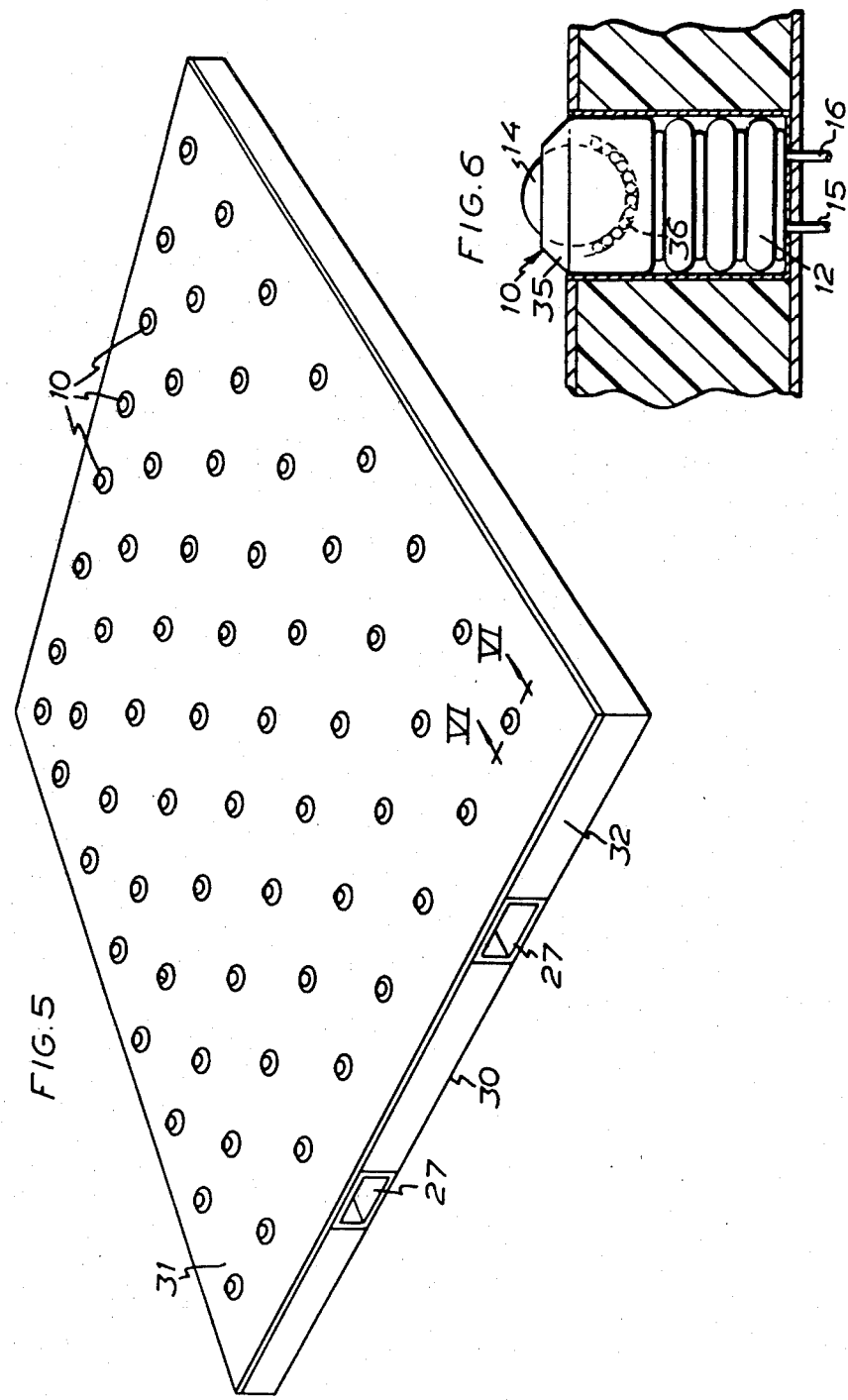

PALLET FOR USE AS A LOAD-CARRYING SUPPORT

The present invention is concerned with pallets and more particularly relates to a light-weight, relatively strong pallet.

Within almost all branches of cargo handling the pallet has gained an ever greater importance as an aid in facilitating cargo handling. The conventional wooden pallet is so important to cargo handling technics that many countries have agreed on standardization, resulting in the so-called Europallet.

A well-known slogan says that "a container may be worth its weight in gold", but even such an expensive cargo unit must often rest on a simple wooden pallet. A pallet has the task not only of forming a load carrier for cargo in relation to a support, but also of serving as an aid in transporting and reloading of cargo, and is therefore of such a construction that it can be lifted and conveyed by means of manual pallet trucks, fork lift trucks and other similar means of lifting and transportation.

The conventional wooden pallets are indispensable in load handling technics and are very inexpensive, but also suffer from drawbacks and restrictions of their usefulness. They are for example relatively heavy and are easily damaged during transport and reloading. It is frequently considered unprofitable to return empty pallets to the sender. Another drawback and restriction is that the conventional pallets cannot usually be utilized as a load carrying support during conveyance of goods on many types of conveyors employed in modern load handling technics, for example in cargo terminals and similar reloading stations for transfer of cargo between truck freight and air freight.

This invention has for its object to provide a light-weight and strong pallet intended to serve, in certain respects, as a substitute or complement of the conventional pallet and especially to facilitate loading, unloading and transfer of goods of the type that is normally, at least during some phase of goods transportation, carried on pallets, and a specific object of the invention is to provide a light-weight, strong pallet which permits moving goods both by means of the pallet and in relation to it, i.e. on transfer of goods to and from the pallet.

To this end, the pallet according to the invention comprises a body in the form of a rectangular framework of light metal or aluminum beams interconnected by welding, and a load-carrying surface formed by a plurality of roller means, preferably ball roller means, connected to the framework, and the pallet is provided with at least one brake roller which is supported in such a position that goods having planar undersides which, when carried on the pallet, are shifted on the ball roller means, will be braked by the brake roller.

Preferred embodiments of the invention are characterised by the following features.

The brake roller or each brake roller is supported by a swiveling frame connected to the framework of the pallet.

The pallet is equipped on at least one side with a detachably mounted guide rail.

The pallet is provided at at least two corners with raisable or lowerable brake means or readily detachable stop abutments.

The ball roller means and their bearings are supported in a raisable and lowerable fashion by pressure medium operated cylinders, preferably in the form of inflatable bellows.

The brake rollers are supported in a raisable and lowerable fashion and urged towards an upper end position by a resilient load.

The brake rollers are supported in a raisable and lowerable fashion by means of a pressure medium operated bellows or cylinder arrangement.

The pallet body formed by the framework includes cellular plastic with rigid cell walls, arranged in the hollow spaces between the beams.

The framework beams comprise two parallel beams constituting channel guides for lift forks.

The beams serving as guides for lift forks are of a cross-section composed of a T-section and a box beam section in a continuous piece, the web of the T-section extending centrally from the upper side of the box beam section.

The invention will be described in greater detail hereinbelow with reference to the accompanying drawings in which:

FIG. 2 shows the pallet of FIG. 1 seen from one side;

FIG. 3 is a section taken on line III—III in FIG. 1;

FIG. 4 is a perspective view, seen from above, of an embodiment of the pallet in FIGS. 1-3, which is intended for simpler tasks;

FIG. 5 is a similar perspective view of a modification of the simplified embodiment of the pallet in FIG. 4; and FIG. 6 on a larger scale and in a fragmentary cross-section taken on line VI—VI in FIG. 5 shows a ball roller unit comprising a ball which can be raised and lowered by means of a pressure medium operated cylinder.

Figure 1:
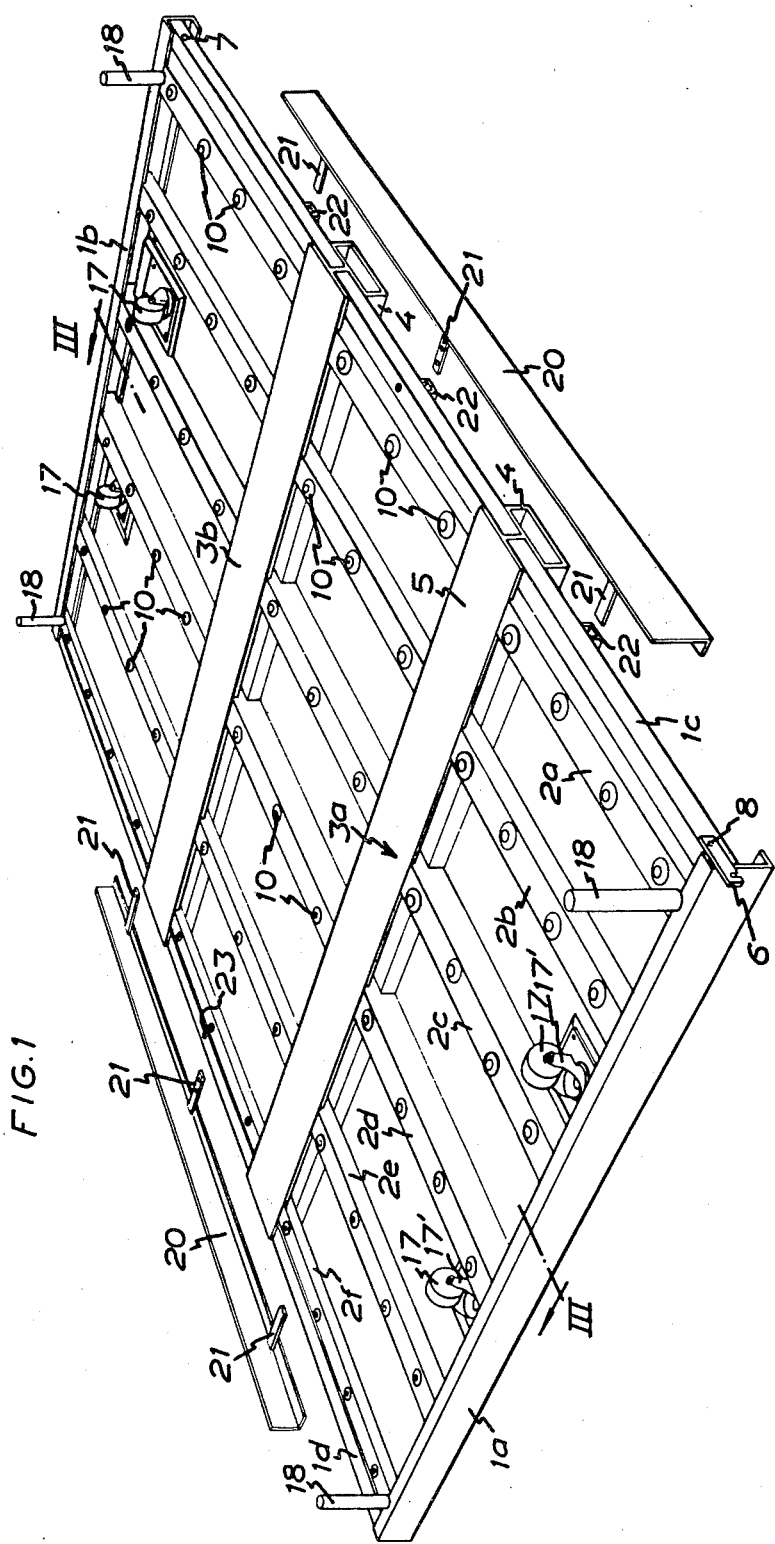
FIG. 1 is a perspective view showing a preferred embodiment of a pallet according to the invention, as seen from above.

The pallet illustrated in FIG. 1 is assembled in its entirety from light-weight aluminum profiles and comprises a rectangular framework made from channel sections welded together at the corners, the channel sections 1a, 1b at the two short sides of the framework having their flanges directed horizontally towards each other, while the webs are vertical and constitute the end surfaces of the framework. The two channel sections 1c, 1d at the long sides of the framework are disposed with their webs horizontal and with their flanges directed downwardly or with their webs vertical and their flanges directed inwardly, said channel sections extending with their ends into engagement with the inner sides of the webs, and being recessed for the upper flanges of, the adjoining channel sections 1a and 1b, respectively, at the short sides of the framework and welded to said adjoining channel sections.

Between the channel sections 1a, 1b at the short sides of the framework there extend in parallel with the channel sections 1c, 1d at the long sides of the framework a number of channel or L-sections 2a–2f which are spaced equally large distances apart and of which the sections designated 2a, 2b, 2e and 2f have the same dimensions between themselves, while the outer channel sections 2a, 2f are disposed relatively close to the longitudinal framework sections 1c, 1d for a purpose to be described in the following. In the central portion of the framework there extend two transverse beams 3a, 3b which are of a form composed of a T-section and a box beam section, the web of the T-section 4 extending from the upper side of the box beam section 5, as shown. The T-section and box beam section of each transverse beam 3a, 3b may be formed in a continuous piece. The longitudinal beams (sections) except for those designated 2c and 2d preferably have the same height as the distance between the horizontal flange of the T-section 4 and the upper side of the box beam section 5 such that they fit therebetween. The longitudinal beams (sections) 1c, 1d of the framework are each divided into three portions which at their adjoining ends are separated by the webs of the central beams 3a, 3b and connected to said beams by welding.

All beams 1a–1d, 2a–2f and 3a, 3b are interconnected by welding at their interengaging surfaces and the framework forming the pallet is characterised in that it is light-weight, but very rigid and strong.

The beams designated 2a–2f may be in the form of L-sections or channel sections with horizontal flanges. The longitudinal beams designated 2a, 2b, 2e, 2f, which have the same height as the beams 1c, 1d, may be divided into portions in the same way as said beams 1c, 1d and connected to the transverse beams 1a, 1b, 3a, 3b, but alternatively they may be continuous and extend through the webs of the transverse beams 3a, 3b. Each of the two central longitudinal beams 2c, 2d (see FIG. 1) is also divided into three portions which are connected to the central transverse beams 3a, 3b in the manner apparent from FIG. 3, but they are of an equally large height as the transverse beams 1a, 1b, and 3a, 3b and are recessed for the upper flanges of said beams such that they can bear against the undersides thereof. Besides, they are provided with recesses for accommodating the two flanges of the transverse beams 1a, 1b and the box beam sections of the central transverse beams 3a, 3b at the ends of the portions (see FIG. 3). Thus, the box beam sections 4 have through open-ended hollow spaces for accommodation of lift forks.

For end-to-end connection of two or more pallets according to the invention the pallet may be provided at the corners with readily disengageable coupling means, which are indicated by means of a hook 6 symbolically shown in FIG. 1 at one corner of one short side of the pallet, and a bolt 7 at one corner of the other short side thereof. The hook 6 illustrated is pivoted to the pallet by means of a bolt 8. Preferably, however, the coupling means shall be countersunk in recesses at the corners so as not to protrude from the pallet sides.

Each pallet is provided with supporting surfaces in the form of ball roller means 10. Thus, each of the longitudinal beams (sections) 2a–2f are provided with one row of ball roller means 10, for example ball roller means of the KU or KUF type, sold by Tellus Maskin AB, but use is preferably made of a construction modified according to the invention, in which the balls in the ball housings rest on pressure medium operated bellows-type cylinders which may fundamentally agree with the type of pressure medium operated bellows-type cylinders sold by Mecmans Svenska Marknads AB under the designation Series 1900. Such a modified construction is shown in section in FIG. 6.

The balls of the ball roller means 10 rise above the upper sides of the transverse beams 1a–1d and the transverse central beams 3a, 3b and, as a consequence, also rise above the upper sides of the other beams 2a–2f. With the use of roller means balls 14 according to FIG. 6 which are raisable and lowerable by means of pressure medium operated cylinders 12, the balls may be lowered to a level below the highest level just mentioned to lower goods such that they will rest on the upper sides of the outer beams 1a–1d and the transverse means 3a, 3b. By supply of compressed air to the bellows-type cylinders having compressed air inlets and outlets 15, 16, the balls can be raised and due to the elasticity of the compressed air the load is uniformly distributed onto the balls. The inlets 15 and possibly also the outlets 16 for the bellows-type cylinders of all ball roller units 10 may be interconnected so that the pallet has but one inlet and one outlet common to all bellows-type cylinders.

This arrangement according to the invention permits moving goods by causing them to shift on the balls of the pallet, which highly facilitates loading and unloading. For braking the movement of the goods and thus preventing them from suddenly rolling off, the pallet according to the invention is provided with a number of brake rollers 17 which are preferably of the caster type such that the goods can be moved in any direction whatever on the pallet and braked by the brake rollers as said rollers can swivel in the direction of motion of the goods. Suited as brake rollers is the type sold under the designation "Series BR" by Wilhelm Sonesson AB. Preferably, however, a modified type should be used, in which the brake rollers instead of being mounted to yokes are mounted in caster frames 17', as shown in FIG. 1.

As already mentioned, the box beam sections 4 of the transverse central beams 3a, 3b form at their ends and thus at the longitudinal sides of the pallet open guide channels which are intended to receive the lift forks of fork lift trucks or like means of transportation, with which the pallet and its load can be lifted.

To give examples of the dimensions of the described beams (sections) it may be mentioned that the transverse beams 1a, 1b and 3a, 3b may have a height of 150 mm and a web height of 60 mm, i.e. the same height as the beams designated 1c, 1d, 2a, 2b, 2e and 2f. The beams designated 2c and 2d have the same height as the transverse beams. All upper surfaces lie in one and the same plane. By reason of the construction illustrated the beams for a normal container load generally need not be of a material thickness greater than about 4 mm. In the embodiment illustrated, however, the upper wall of the box beam section 4 which forms part of the respective transverse beam 3a, 3b, is of a thickness increased to 5 mm, while the T-section may have a flange and web thickness of 3 mm.

Stop abutments for goods at the short sides of the pallet are arranged at the corners thereof in the form of preferably detachable and preferable tubular stop pins 18 which are adapted to be locked for example by bayonet catches in guide sleeves (not shown) at the corners of the framework. Guide rails 20 in the form of L-section beams are arranged at the long sides of the pallet. The guide rails can be detachably mounted to the pallet in that they are provided with strips 21 welded thereto and extending inwardly from the guide rails 20, said strips 21 being insertable in guides having the form of short tube pieces 22 of square section and of sufficient length to bridge a longitudinal beam 1c, 1d and the adjoining longitudinal beams 2a, 2f, to the undersides of which they are welded. The strips 21 can have one hole or a row of holes and a pallet can present corresponding holes at the long sides, for example as shown at 23, to permit locking the longitudinal guide rails 20 to the framework with the aid of pins. By this arrangement it is possible to adjust the distance of the guide rails to the adjoining long sides of the pallets.

FIG. 4 shows a simplified construction in which the short and long sides of the framework are formed by identical beams in the form of identical channel or box beam sections 25. The central longitudinal beams 26 may also have the form of identical channel or box beam sections, and the transverse central beams 27 which are to form guides for lift forks, may have the form of simple open-ended box beams. The outer beams and the longitudinal central beams of the framework are provided with ball roller means 10 arranged in rows, and brake rollers 17 supported by caster frames are mounted at the corners of the framework/pallet.

FIG. 5 shows a further modified embodiment which comprises a body which may have the same construction as the framework shown in FIG. 4, but is provided with a bottom 30 and a deck 31. As shown in FIG. 6, the space between the bottom and the deck may be filled out with a suitable rigidifying foam plastic layer 32. The bottom 30, the deck 31 and the intervening filling 32 of rigid foam plastic constitute a stable support for a number of ball roller means 10 distributed throughout the pallet in such a manner that each of the two central box beams 27 serving as guides for lift forks will be accommodated between two adjoining rows of balls.

The two embodiments in FIGS. 4 and 5 may be provided with stop pins or detachable stop blocks, and the embodiment shown in FIG. 5 may have brake rollers similar to the embodiment first described.

The ball roller means utilized and illustrated in FIG. 6 have already been described when the embodiment shown in FIGS. 1–3 was discussed.

The bellows-type cylinder in FIG. 6 is adapted to raise the ball roller means by lifting a bearing box 35 which contains a bed 36 of small bearing balls for the roller means ball 14.

The pallet according to the invention is not meant to replace the function of the conventional pallet as a carrying support for goods in warehouses or other depots (although it may be used also for this purpose) but is primarily intended for use as a temporary load-carrying pallet for example in cargo terminals and other reloading stations, the pallet according to the invention permitting transfer of goods to it for example from a roller conveyor and transfer of goods from pallets to another roller conveyor by a shifting movement. The pallet according to the invention thus differs with regard to usefulness from a conventional pallet, from and to which goods have to be transferred by lifting.

The pallet according to the invention can also be used as an auxiliary conveyor, for example on truck platforms, and due to its insignificant weight it can without disadvantage accompany the goods during transport in order to be used by the truck driver on unloading of the truck. By coupling together several pallets a long roller conveyor path is readily assembled.

When the pallet is placed on an inclining support brake rollers prevent the goods from getting into uncontrolled motion. By transfer of goods from the pallet to a load-carrying surface (for example in an aircraft) which is provided with raisable and lowerable ball roller means 10 and optionally also with brake rollers 17, 17' of the type described, the goods after they have been put in position can be lowered so as to rest on a friction layer, whereby the goods can more readily be prevented from getting into unintentional motion. For unloading, the roller means can again be raised.

If desired, the pallet according to the invention can be equipped with other rollers than ball roller means, for example cylindrical rollers mounted on axes is channel sections with upwardly directed flanges, and the pallet can also be equipped with ball roller means or casters at the underside to permit rolling the pallet over a support, for example a truck platform. To permit moving a conventional pallet with its load on a pallet according to the invention, a board, for example a Masonite ® board, can be placed on the upper side of the pallet according to the invention so that it rests on the balls (or rollers). Alternatively, a board can be connected to the underside of the conventional pallet. Similarly, a board can be utilized for goods having uneven or sensitive undersides.

The transverse and longitudinal beams 1a–1b of the pallet can be provided with suitable fastenings for goods-protecting canopies, for example for so-called TIR-loops.

In the above description mention has been made of aluminum beams as the material of the framework of the pallet, but of course use can also be made of beams of light metal alloys. A conceivable alternative of light metal is plastic with a suitable reinforcement, in which case the body can be moulded in one piece with cavities and reinforced areas for the mounting of the ball roller means and the brake rollers.

All these possibilities fall within the scope of the present invention.

Common to the embodiments described is a lightweight, load-carrying framework structure having a transport surface formed by rollers which are preferably in the form of ball roller means and are arranged in rows, and with brake rollers at at least one side (for simplification, no such brake rollers have been shown in the embodiment of FIG. 5). Another common structural feature is that the framework is constructed from light-weight sections of aluminum or light metal and that the framework has an arrangement which permits the insertion of lift forks, for example the forks of fork lift trucks, manual pallet trucks, overhead travelling cranes etc.

I claim:

1. A lightweight pallet intended for use as a load-carrying support for goods, comprising a body in the form of a rectangular framework of beams of light metal interconnected by welding, and a load-carrying surface formed by roller means which comprise a plurality of ball roller means mounted in the framework to rollingly support the goods, wherein said roller means also comprise at least one brake roller means mounted in the framework for braking engagement with goods supported on the balls of said ball roller means, said pallet further comprising means permitting relative movement of said ball roller means and said brake roller means to permit non-braked movement of said goods in either of at least two opposite directions.

2. A pallet as claimed in claim 1, wherein said means permitting relative movement comprise a swiveling frame connected to said framework and supporting the roller of said brake rollers means.

3. A pallet as claimed in claim 1, wherein said means permitting relative movement comprise pressure fluid operated cylinders for raisably and lowerably supporting ball roller bearings.

4. A pallet as claimed in claim 3, wherein said pressure fluid operated cylinders are inflatable bellows.

5. A pallet as claimed in claim 1, wherein the pallet is equipped on at least one side thereof with a detachably mounted guide rail.

6. A pallet as claimed in claim 1, wherein the pallet is provided, at least at one corner thereof, with a readily detachable stop abutment means.

7. A pallet as claimed in claim 1, wherein the framework beams comprise two parallel beams constituting channel guides for lift forks, and said parallel beams serving as guides for lift forks are of a cross-section composed of a T-section and a box beam section in continuous piece, the web of the T-section extending centrally from the upper side of the box beam section.

8. A pallet as claimed in claim 7, wherein said supporting means comprises pressure fluid operated means.

9. A pallet as claimed in claim 1, wherein said means permitting relative movement comprise means raisably and lowerably supporting said at least one brake roller and means for moving the brake roller to, and maintaining it resiliently at, an upper end position.

10. A pallet as claimed in claim 1, wherein said light metal is aluminum.

* * * * *